Nov. 18, 1930.  R. CLUFF  1,782,288
PROJECTING APPARATUS
Filed Aug. 17, 1927   6 Sheets-Sheet 1
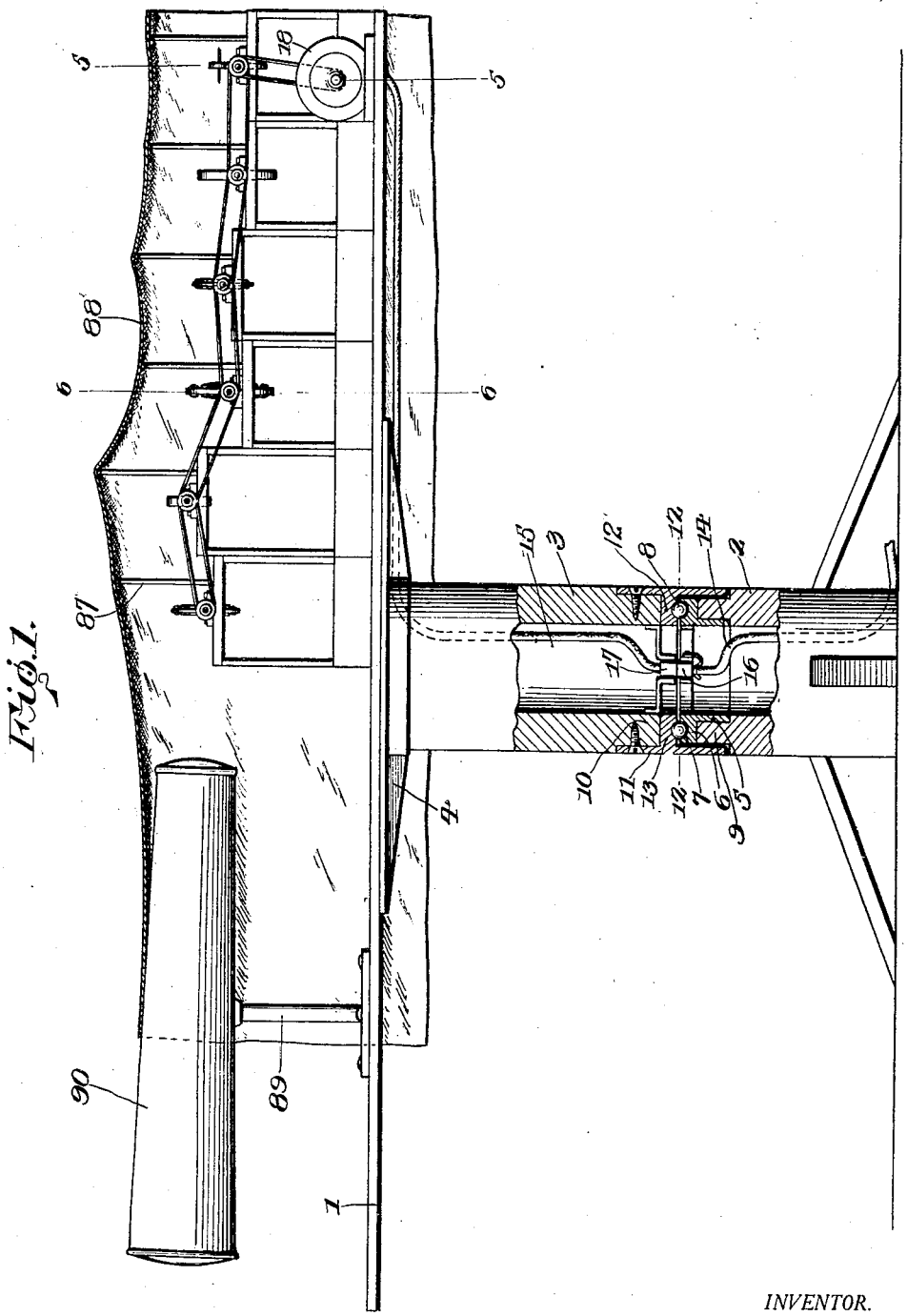
INVENTOR.
Rohan Cluff,
BY Geo. P. Kimmel
ATTORNEY.

Nov. 18, 1930.   R. CLUFF   1,782,288
PROJECTING APPARATUS
Filed Aug. 17, 1927   6 Sheets-Sheet 2
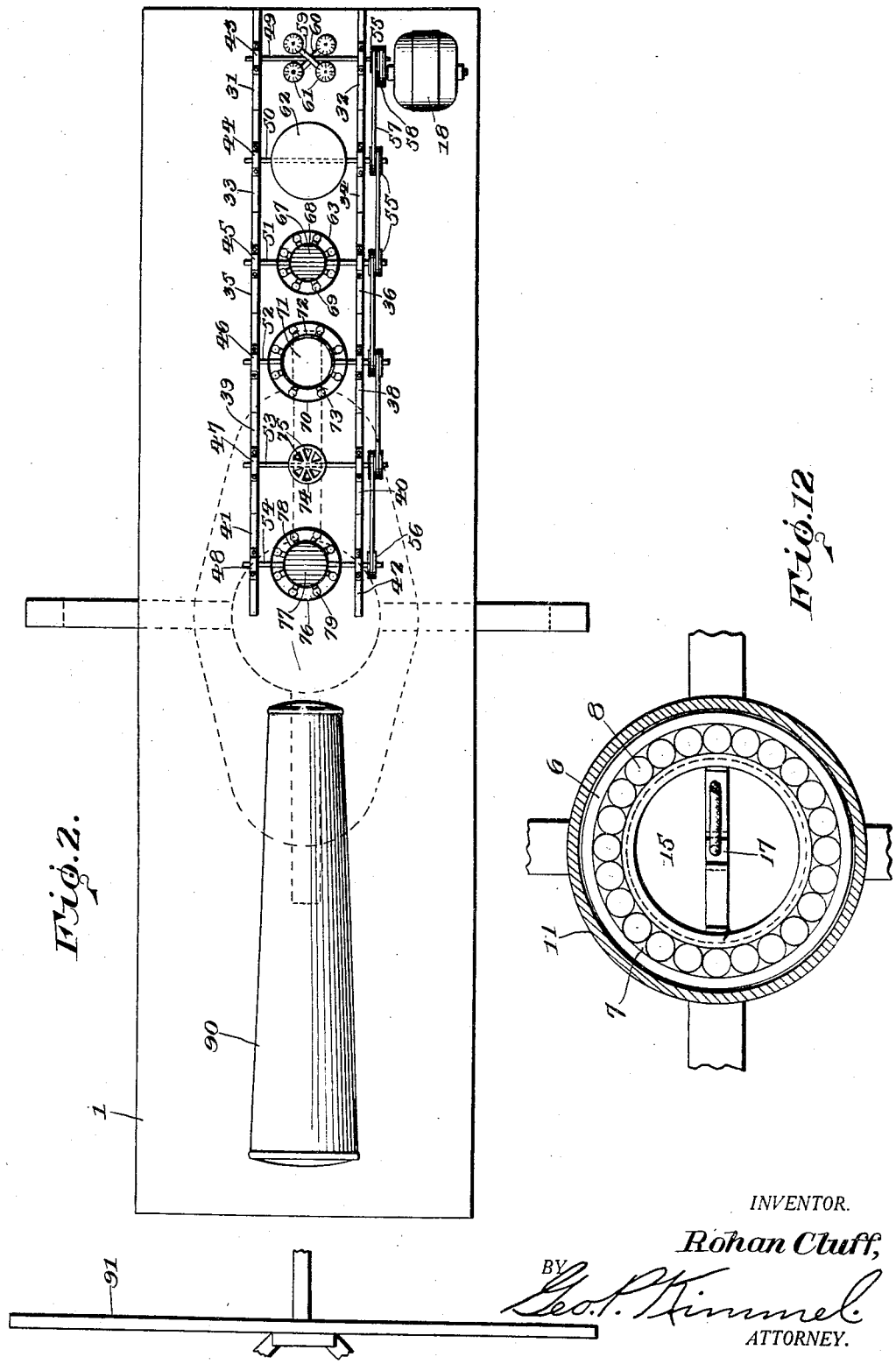
INVENTOR.
Rohan Cluff,
BY
Geo. P. Kimmel
ATTORNEY.

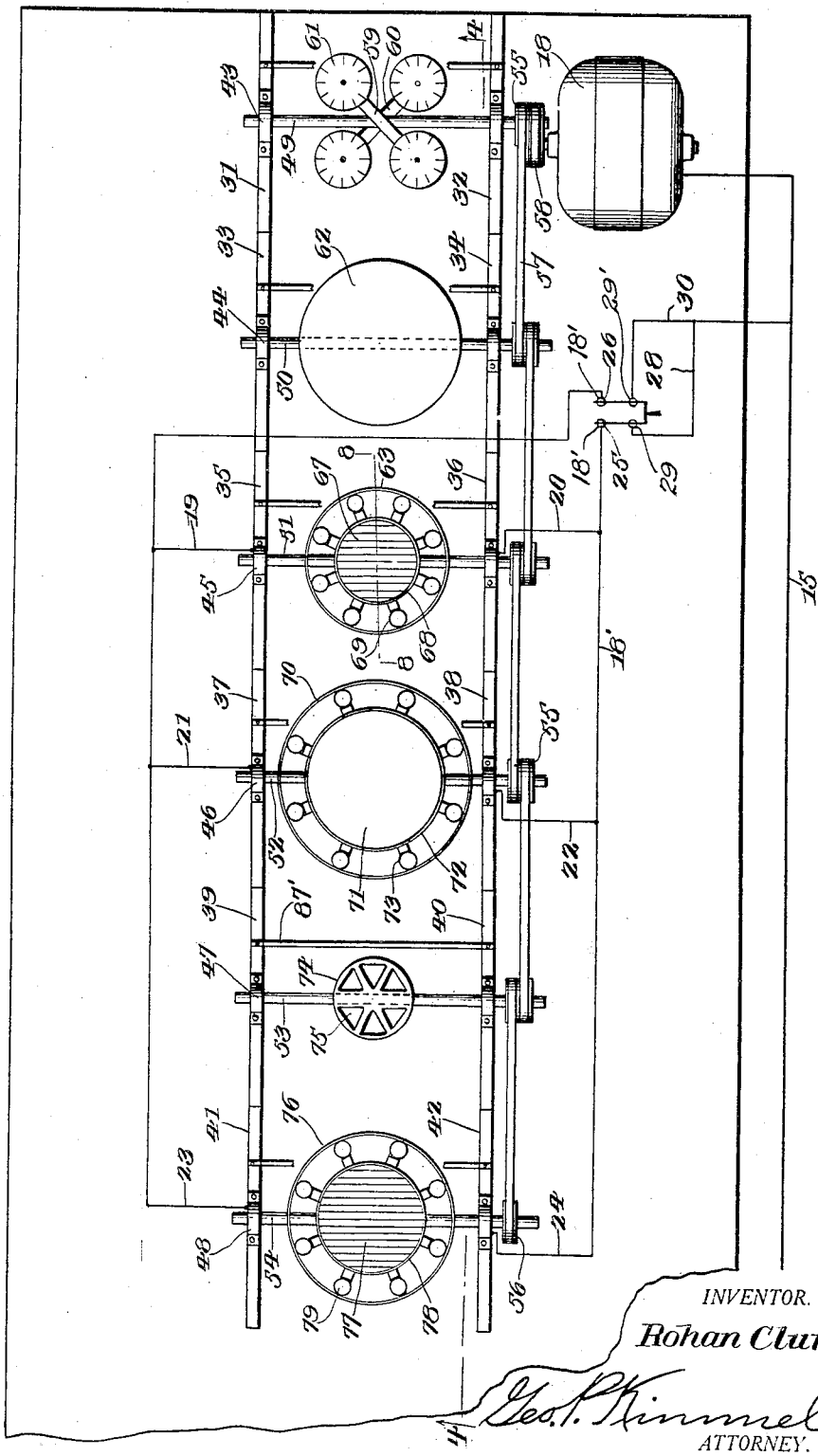

Nov. 18, 1930.    R. CLUFF    1,782,288
PROJECTING APPARATUS
Filed Aug. 17, 1927    6 Sheets-Sheet 4
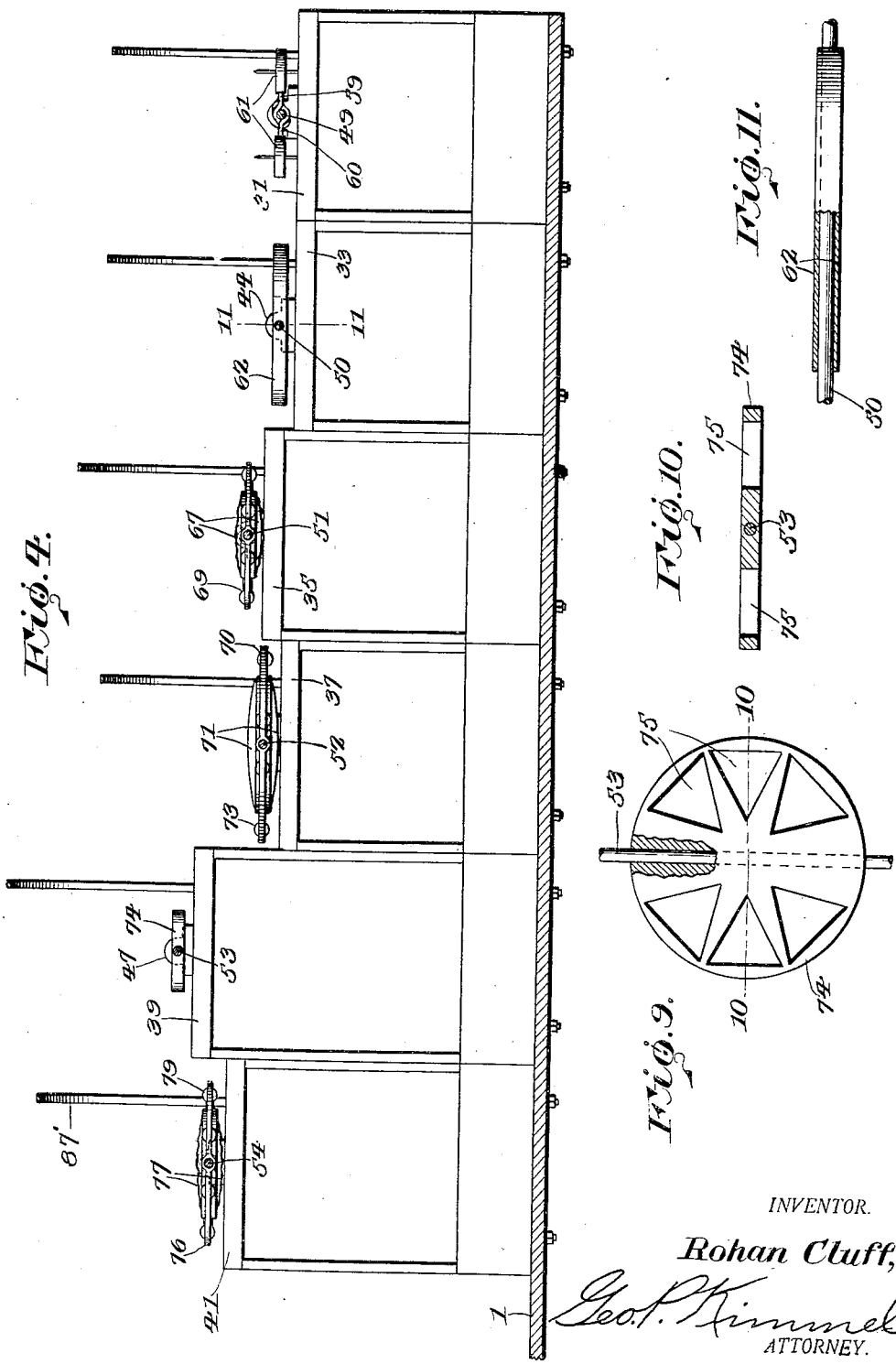
INVENTOR.
Rohan Cluff,
Geo. P. Kimmel
ATTORNEY.

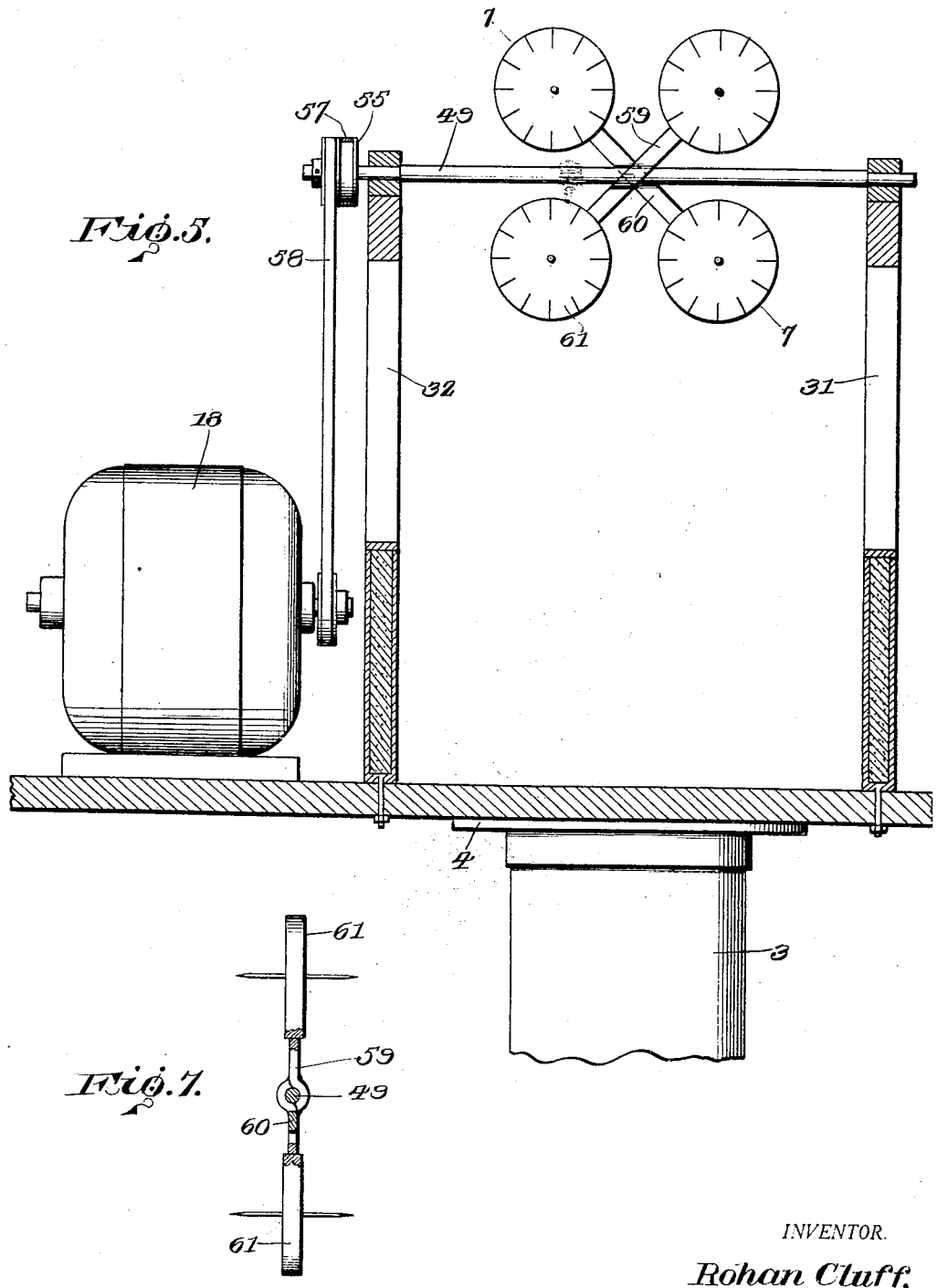

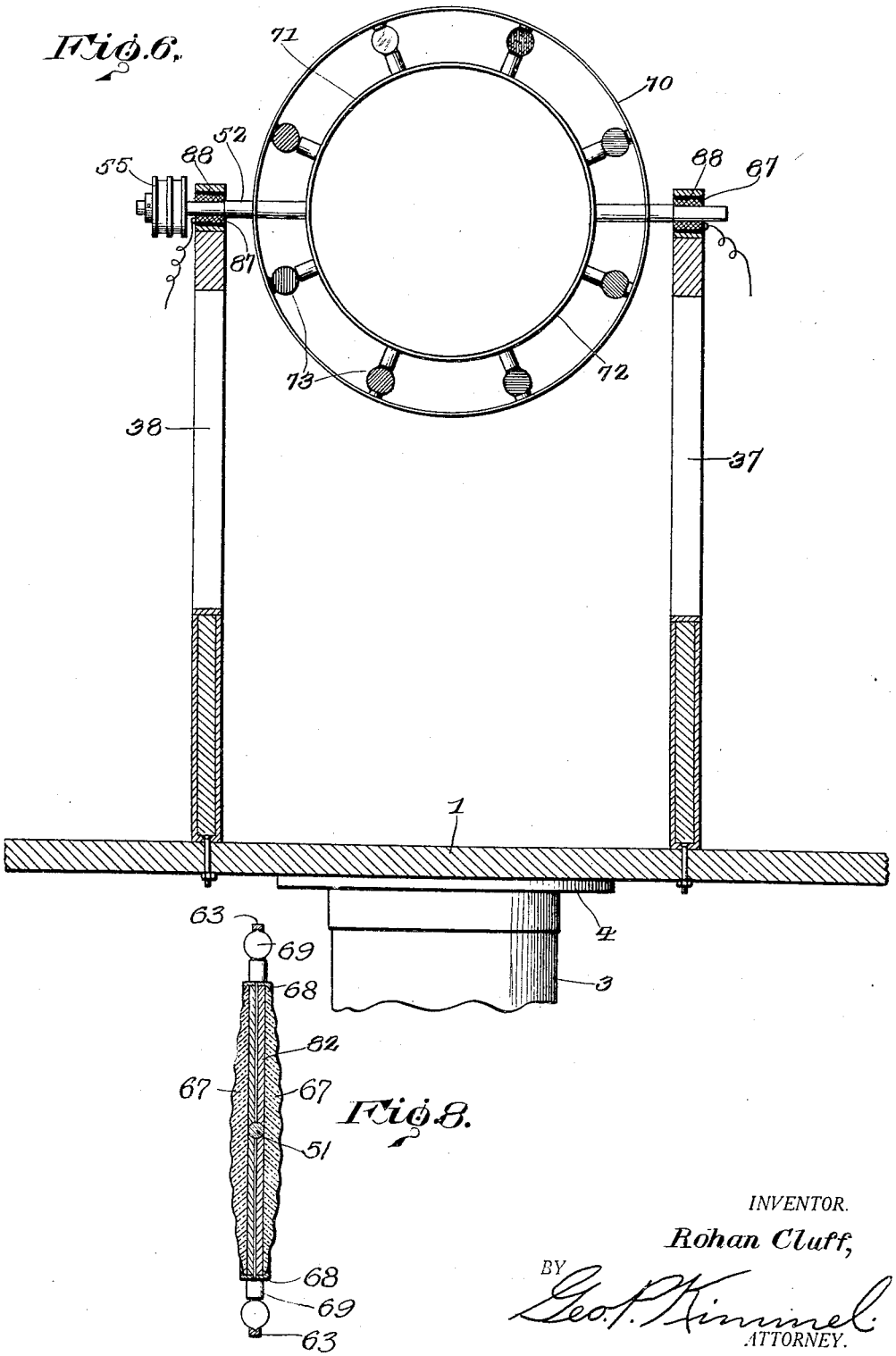

Patented Nov. 18, 1930

1,782,288

UNITED STATES PATENT OFFICE

ROHAN CLUFF, OF NOGALES, ARIZONA

PROJECTING APPARATUS

Application filed August 17, 1927. Serial No. 213,594.

This invention relates to a projecting apparatus and has for its object to provide, in a manner as hereinafter set forth for projecting upon a screen differently colored animated designs or figures derived from shadows.

Further objects of the invention are to provide, in a manner as hereinafter set forth, a projecting apparatus which is comparatively simple in its construction and arrangement, strong, durable, adjustable, compact, thoroughly efficient in its use, readily assembled, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a side elevation, partly in section, of a projecting apparatus in accordance with this invention showing the adaptation thereof in connection with a screen upon which the animated picture is projected.

Figure 2 is a top plan view of the apparatus with the cover element removed.

Figure 3 is a fragmentary view, in top plan, of the apparatus upon an enlarged scale and further illustrating the electric circuits.

Figure 4 is a fragmentary view, in side elevation, upon an enlarged scale of the apparatus.

Figure 5 is a section on line 5—5 Figure 1.
Figure 6 is a section on line 6—6 Figure 1.
Figure 7 is a section on line 7—7 Figure 5.
Figure 8 is a section on line 8—8 Figure 3.
Figure 9 is an elevation, partly broken away, of the booster element.

Figure 10 is a section on line 10—10 Figure 9.

Figure 11 is a section on line 11—11 Figure 4.

Figure 12 is a section on line 12—12 Figure 1.

The apparatus includes a rotatable table 1 preferably 8 feet long and 28 inches wide, but the dimensions thereof can be changed as desired. Preferably the table will be at a height, above the floor, of 40 inches, but such position can be changed as desired.

The material from which the table is to be constructed will be very highly polished steel or other suitable metallic material, so that the table will reflect light. The table 1 is supported centrally by a single standard comprising a fixed or stationary lower portion 2 and a rotatable upper portion or section 3 provided with a head piece 4 which is fixedly secured to the lower face of the table 1. A metallic annular sleeve 5 is seated against the inner face of the portion or section 2 at the upper end thereof, projects thereabove and is formed with an outwardly extending annular flange 6 provided with a groove 7 to form a ball race for the bearing balls 8. The upper end of the section 2 is reduced as at 9 and the flange 6 is flush with the outer periphery of said reduced portion 9. The lower end of the section 3 is also reduced, as indicated at 10 and secured to, as well as depending from said reduced portion 10 is a sleeve 11 which envelopes the said reduced end portions 9, 10 of the sections 2, 3. The sleeve 11 is formed intermediate with its ends with an inwardly extending annular flange 12' which opposes the flange 6 and has its lower face formed with a groove 13 forming a ball race for the balls 8. The standard is hollow for the passage therethrough of circuit connections 14, 15. Arranged within the sections 2, 3, is a circuit closer including a lower part 16 and an upper part 17. The part 17 is carried by the section 3, and is in permanent contact with the part 16 which is carried by the section 2. The circuit closer includes a pair of contact members, one carried by the upper part and the other carried by the lower part and that one carried by the lower part is spring controlled for the purpose of maintaining them in permanent contact. The circuit connections 14 are electrically attached to the lower part 16 and the circuit connections 15 are electrically connected to the upper part 17. It will be stated however that any form of circuit closer for maintaining the circuit connections 14, 15 in permanent electrical contact can be employed. The circuit connections 15 project outwardly through the head 4.

The construction and arrangement of the table is such that it can be adjusted in a complete circle so that it will come in contact, with the light waves, in any particular part of the complete circle. Supported on the table is an electric motor 18 employed for revolving certain elements of the apparatus to be hereinafter referred to. The circuit connections 15 lead to the motor 18. Electrically connected with the circuit connections 15 are three light circuits and common thereto is a pair of circuit conductors 18' and one of the lighting circuits includes a pair of conductors 19, 20, another the circuit conductors 21, 22 and the other the circuit conductors 23, 24. The circuit conductors 19 to 24 inclusive are electrically connected with the circuit conductors 18' and the latter has its ends attached to a switch base, as at 25, 26. Circuit connections 28, 30 leading from the connections 15 are attached to the switch base as at 29, 29'. A duplex knife switch is carried by the switch base and provides for opening and closing the lighting circuits.

Secured upon the upper face of the platform 1 and extending from one end thereof to its transverse center is a series of pairs of frames. The frames of one pair abut against the frames of the other pairs. Each of the frames is of rectangular contour and is vertically disposed. The frames of one pair are indicated at 31, 32, the frames of another pair at 33, 34, the frames of another pair at 35, 36, the frames of another pair at 37, 38, the frames of another pair at 39, 40, and the frames of the remaining pair at 41, 42. The frames of each pair oppose each other and each pair of frames provides a supporting means for a purpose to be presently referred to. Each frame includes a base bar, a pair of vertical side bars, and a top bar secured upon the upper ends of the side bars. The bottom or base bar of each frame is fixedly secured to the table 1. Each pair of frames are arranged in spaced relation. Each of the bars of each of the frames is formed of highly polished metal, preferably steel. Each base or bottom bar of a frame will preferably be 4 inches in height and hollow. Each base or bottom bar of a frame is filled with steel carbon. The frames 31, 32, 33 and 34 preferably are nine and three-quarter inches in height. Each of the frames 35, 36 is preferably eleven inches in height. Each of the frames 37, 38 is of the same height as either of the frames 31, 32, 33 and 34. Each of the frames 39, 40 is thirteen inches in height. Each of the frames 41, 42 is twelve inches high. Mounted on the tops of the frames 31, 32 is a pair of opposed bearings 43. Mounted on the tops of the frames 33, 34 is a pair of opposed bearings 44, on the tops of the frames 35, 36 is a pair of opposed bearings 45, on the tops of the frames 37, 38 is a pair of opposed bearings 46, on the tops of the frames 39, 40 is a pair of opposed bearings 47 and on the tops of the frames 41, 42 is a pair of opposed bearings 48.

Journaled in the bearings 43, 44, 45, 46, 47 and 48 are shafts 49, 50, 51, 52, 53, and 54, respectively. The shafts 49 and 54 inclusive project from the frames 32, 34, 36, 38, 40 and 42. The shafts 49 to 53 inclusive are provided with a double grooved pulley 55 adjacent the frames 32, 34, 36, 38, and 40. The shaft 54 adjacent the frame 42 is provided with a pulley 56. Belt transmissions 57 are arranged between the pulleys for the purpose of simultaneously rotating the shafts 49 to 54 both inclusive. The pulley 55 on the shaft 49 is driven from the motor 18 by a belt transmission 58.

Fixedly secured to the shaft 49, centrally thereof, is a pair of oppositely extending, inclined bars 59, 60 and each of which has connected to each end thereof a circular disc 61 having both of its faces formed to provide a sun dial. The diameter of each of the discs 61 will be approximately two inches. The discs 61 are arranged in alignment and in edge opposed relation. The discs 61 are constructed of highly polished metallic material, preferably steel. Each face of the disc 61 is what may be termed a regular sun-dial clock face.

Fixedly secured to the shaft 50 and bodily carried therewith is a circular disc 62 having both of its faces highly polished and said disc 62 provides a double reflector. The diameter of the reflector is approximately six inches.

Fixedly secured to the shaft 51 is an annulus 63 of less diameter than the disc 62 and arranged within the annulus 63 is a pair of convex corrugated or wavy surface mirrors 67 connected together by a band 68. Interposed between the mirrors are backings 82, see Figure 8. Arranged between the annulus 63 and the band 68, as well as being fixedly secured therewith is a series of radially disposed illuminating devices 69 in the form of lamps.

Carried by the shaft 52 and bodily movable therewith, when the shaft 52 is rotated, is an annulus 70 of greater diameter than the annulus 63 and arranged within and spaced from the annulus 70 is a pair of plane mirrors 71 connected together by a band 72.

Interposed between the annulus 70 and the band 72 is a series of illuminating devices 73 fixedly secured to said band and annulus.

Fixedly secured to the shaft 53 and bodily carried therewith is a booster element 74, in the form of a circular metallic disc, having both of its faces highly polished. The element 74 is provided with spaced triangular shaped openings 75. The element 74 is materially less in diameter than any of the other elements referred to.

Fixedly secured to the shaft 54 and bodily carried therewith is an annulus 76 of greater diameter than the annulus 63, but of less diameter than the diameter of the annulus 70. Arranged within the annulus 76, as well as being spaced therefrom, is a pair of oppositely disposed corrugated mirrors or reflectors 77 secured together by a band 78. Secured to the band 78 and annulus 76 is a series of radially disposed illuminating elements 79, in the form of lamps. The mirrors 67 are of less diameter than the mirrors 71, and also of less diameter than the mirrors 77. The mirrors 77 are of greater diameter than the mirrors 67 but of less diameter than the mirrors 71.

The mirrors of the pair 71 or the mirrors of the pair 77 are set up relatively to each other in the same manner as the mirrors of the pair 67 as shown in Figure 8.

The shafts 51, 52 and 54 are mounted in brass bushings 87. Secured to each pair of opposed frames is a vertically disposed inverted yoke-shaped support 87' for a cover 88'. Mounted upon the table 1 is a standard 89 which supports a telescope 90 employed for projecting the lights and shadows upon a screen 91 to form an animated picture of the announcer, artist or entertainer broadcasting.

The several shafts are driven to provide for the revolving of the sun dials, reflector, mirrors and booster element at 1500 revolutions per minute. The lamps are illuminated during the revolving of the mirrors. Eight illuminating elements are associated with each pair of mirrors and they are of different colors, such as crystal, orange, violet, green, blue, brown, red and purple. The illuminating devices of each set are arranged equi-distantly apart. The mirrors 67 are three inches in diameter. The mirrors 71 are five inches in diameter and the mirrors 77 four inches in diameter. The mirrors 67 are oppositely disposed, as well as the mirrors 71 and also the mirrors 77. The telescope is disposed centrally with respect to the frames of each pair. It is spaced approximately eight inches adjacent to the frames 41, 42. That end of the telescope which is arranged adjacent to the frames 41, 42 will be provided with a six inch lens and its other end with an eight inch lens. The telescope will be about three feet in length and be positioned approximately seventeen inches above the table. The telescope will be black on its inside and black on its periphery.

The co-relation between the sun dials, reflector, mirrors and booster element is revolution to further light receiving and reflecting therebetween. The shadow or shadows formed on the sun dials will be attracted by the reflector 62, and the mirrors 67 and 71 in connection with the illuminating devices will respectively create a greater attraction, diffuse, color and illuminate the shadow or shadows. The element 74 will act as a booster for the mirrors 77, and the latter must create attraction enough in connection with the lighting devices, so that the telescope will transfer therethrough the shadow to the screen. The revolving elements are so set up to increase the elevation along the lines of the shadow which each separate element attracts, or in other words the shadow or shadows on the sun dials will be also attracted by the reflector and thrown on the mirrors 67 and so on down the line through the telescope and out to the screen.

The cover will extend from one end of the table to about midway of the telescope and as it is opaque or black it will keep the light rays from the illuminating devices on the revolving mirrors, from escaping upward and will also prevent any light waves that may be reflected at the same time from escaping upward, as all the light which is received, must penetrate through the telescope, out to the screen. The screen is positioned a substantial distance from the outer end of the telescope which is so set up that it can be readily adjusted so as to project any light that passes therethrough onto the screen.

The bushings 87 for the shaft 51 have attached thereto the circuit connections 19, 20. The brass bushings 87 for the shaft 52 have connected therewith the circuit connections 21, 22 and the brass bushings for the shaft 54 have connected therewith the circuit connections 23, 24. The brass bushings are insulated from the frames as indicated at 88. The sun dials, reflector, mirrors and booster element are arranged broadside with respect to the telescope.

The arrangement of each series or set of illuminating elements is in the following order crystal, orange, violet, green, blue, brown, red, purple and in this formation the brighter lights are alternately disposed with respect to the darker lights.

The sections of the standard, which supports the table top, can be formed of any suitable material, preferably wood. If desired the table top can be provided with grooves, spaced sufficient distances, for the reception of the bases of the frames and these latter can be secured to the table top, in any suitable manner, preferably by bolts. The grooving of the table top provides a guiding means for and also means for adjustably positioning the frames when desired. It is to be understood however that the table top can be provided with the grooves, or set up without them. If the top is grooved, the base for the telescope would be arranged between the grooves and it is to be understood that the telescope can be positioned at any point desired upon the table top. The telescope will be preferably constructed of aluminum, heavy enough so that it will sit on the table top preferably balanced, on a single support. Preferably the support for the telescope will have a base 8 inches square. The lenses for the telescope will be of very fine French glass. As before stated the telescope will be painted black on its inside and outside so it will not attract the light rays. The illuminating elements will be insulated from the table and revolving mirrors and reflectors. The covering or cloth is to extend over the tops and downwardly with respect to the side of all the frames, mirrors, discs, reflectors and sun dials and half of the telescope to prevent the escape of the light rays from the illuminating elements at the top and sides of the covering. Although the mirrors, disc, sun dials and reflectors are illustrated as being driven by a belt system, yet it is to be understood that they can be driven by any suitable operative drive from the motor.

The filling for the bases of the frames can be pulverized steel, the percentage being two percent carbon and 98% pure steel, or ordinary carbonized steel can be employed, providing it is ground very fine like powder.

It is thought the many advantages of a projecting apparatus, in accordance with this invention, can be readily understood, and although the preferred embodiment of the invention is as illustrated and described, yet it is to be understood that changes in the details of construction can be had which fall within the scope of the invention as claimed.

What I claim is:

1. A projecting apparatus comprising a set of shadow forming elements, a series of light receiving and reflecting elements, one spaced from the other and said elements arranged tandemwise rearwardly of said shadow forming elements, certain of said receiving and reflecting elements having light sources of different colors, means for revolving said elements approximately 1500 revolutions per minute, a telescope arranged adjacent to the inner one of said light receiving and reflecting elements, and a light confining means for said elements and extended upon the telescope at the entrance end of the latter.

2. A projecting apparatus comprising a set of shadow forming elements, a series of light receiving and reflecting elements arranged in spaced relation and tandemwise rearwardly of said shadow forming elements, certain of said receiving and reflecting elements having light sources of different colors, a projecting means for the shadows attracted and enlarged by said light receiving and reflecting elements, said projecting means arranged adjacent to the inner one of said elements, and a light confining means for said elements and extended upon said projecting means at the entrance end of the latter, and means for simultaneously revolving said elements approximately 1500 revolutions per minute.

3. A projecting apparatus comprising a set of shadow forming elements, a series of light receiving and reflecting elements, one spaced from the other and said elements arranged tandemwise rearwardly of said shadow forming elements, certain of said receiving and reflecting elements having light sources of different colors, means for revolving said elements approximately 1500 revolutions per minute, a telescope arranged adjacent to the inner one of said light receiving and reflecting elements, a light confining means for said elements and extended upon the telescope at the entrance end of the latter, and adjustable supporting means for said elements and telescope.

4. A projecting apparatus comprising a set of shadow forming elements, a series of light receiving and reflecting elements arranged in spaced relation and tandemwise rearwardly of said shadow forming elements, certain of said receiving and reflecting elements having light sources of different colors, a projecting means for the shadows attracted and enlarged by said elements, said projecting means arranged adjacent to the inner one of said light receiving and reflecting elements, a light confining means for said elements and extended upon said projecting means at the entrance end of the latter, means for simultaneously revolving said elements approximately 1500 revolutions per minute, and adjustable supporting means for said elements and projecting means.

5. A projecting apparatus comprising a set of connected shadow forming discs each having a pair of sun dial clock faces, a reflector spaced from said discs, a double mirror carrying a series of light sources of different colors, a double mirror of a greater size than the first mentioned double mirror and carrying a series of light sources of different colors, a double mirror of greater size than the first mentioned mirror and of less size than the second mentioned mirror and carrying a series of light sources of different colors, said double mirrors spaced from each other, a disc provided with openings arranged between the second and the last mentioned double mirrors, a projecting means arranged adjacent the last mentioned double mirror, said apertured disc, set of discs, reflector and double mirrors arranged tandemwise, a light confining means extending over the tops and downwardly with respect to the sides of said discs, mirrors, reflectors and extending over the entrance end of said projecting means, and means for revolving simultaneously said set of discs, apertured disc, mirrors and reflectors approximately 1500 revolutions per minute.

6. A projecting apparatus comprising a set of connected shadow forming discs each having a pair of sun dial clock faces, a reflector spaced from said discs, a double mirror carrying a series of light sources of different colors, a double mirror of a greater size than the first mentioned double mirror and carrying a series of light sources of different colors, a double mirror of greater size than the first mentioned mirror and of less size than the second mentioned mirror and carrying a series of light sources of different colors, said double mirrors spaced from each other, a disc provided with openings arranged between the second and the last mentioned double mirrors, a projecting means arranged adjacent the last mentioned double mirror, said apertured disc, set of discs, reflector and double mirrors arranged tandemwise, a light confining means extending over the tops and downwardly with respect to the sides of said discs, mirrors, reflectors and extending over the entrance end of said projecting means, means for revolving simultaneously said set of discs, apertured disc, mirrors and reflectors approximately 1500 revolutions per minute, and an adjustable supporting means for said telescope, mirrors, apertured disc and set of discs.

7. A projecting apparatus comprising a set of shadow forming sun dials, a tandemwise arranged means for receiving light from the sun dials and reflecting it and including a duplex reflector, a duplex booster and a series of duplex mirrors, each of said duplex mirrors bodily carrying a series of light sources of different colors, means for simultaneously revolving said sun dials, reflector, booster and mirrors at 1500 revolutions per minute, a projecting means arranged adjacent to one outer mirror of said series of mirrors, a light confining means extending over the tops and downwardly with respect to the sides of said sun dials, reflector, booster and mirrors and extended upon the entrance end of said projecting means.

8. A projecting apparatus comprising a set of shadow forming sun dials, a tandemwise arranged means for receiving light from the sun dials and reflecting it and including a duplex reflector, a duplex booster and a series of duplex mirrors, each of said duplex mirrors bodily carrying a series of light sources of different colors, means for simultaneously revolving said sun dials, reflector, booster and mirrors at 1500 revolutions per minute, a projecting means arranged adjacent to one outer mirror of said series of mirrors, a light confining means extending over the tops and downwardly with respect to the sides of said sun dials, reflector, booster and mirrors and extended upon the entrance end of said projecting means, the outer surface of certain of said mirrors being of wave-like form.

9. A projecting apparatus comprising a set of shadow forming sun dials, a tandemwise arranged means for receiving light from the sun dials and reflecting it and including a duplex reflector, a duplex booster and a series of duplex mirrors, each of said duplex mirrors bodily carrying a series of light sources of different colors, means for simultaneously revolving said sun dials, reflector, booster and mirrors at 1500 revolutions per minute, a projecting means arranged adjacent to one outer mirror of said series of mirrors, a light confining means extending over the tops and downwardly with respect to the sides of said sun dials, reflector, booster and mirrors and extended upon the entrance end of said projecting means, and adjustable supporting means for said sun dials, reflector, booster and mirrors.

10. A projecting apparatus comprising a set of shadow forming sun dials, a tandemwise arranged means for receiving light from the sun dials and reflecting it and including a duplex reflector, a duplex booster and a series of duplex mirrors, each of said duplex mirrors bodily carrying a series of light sources of different colors, means for simultaneously revolving said sun dials, reflector, booster and mirrors at 1500 revolutions per minute, a projecting means arranged adjacent to one outer mirror of said series of mirrors, a light confining means extending over the tops and downwardly with respect to the sides of said sun dials, reflector, booster and mirrors and extended upon the entrance end of said projecting means, the outer surface of certain of said mirrors being of wave-like form, and adjustable supporting means for said sun dials, reflector, booster and mirrors.

In testimony whereof, I affix my signature hereto.

ROHAN CLUFF.